April 25, 1933.  E. H. WHITE  1,905,325

REMOTE CONTROL REGULATOR MOTOR

Filed March 6, 1931  4 Sheets-Sheet 3

Inventor:
E. H. White.
By Reif & Braddock
Attorneys.

April 25, 1933.  E. H. WHITE  1,905,325

REMOTE CONTROL REGULATOR MOTOR

Filed March 6, 1931   4 Sheets-Sheet 4

Inventor:
E. H. White
By Reif & Braddock
Attorneys

Patented Apr. 25, 1933

1,905,325

UNITED STATES PATENT OFFICE

EVERETT H. WHITE, OF ST. PAUL, MINNESOTA

REMOTE CONTROL REGULATOR MOTOR

Application filed March 6, 1931. Serial No. 520,758.

This invention relates to electrically operated mechanisms for the remote control of heat producing devices or furnaces which include heat regulating means, such, for example, as heating plant dampers, steam, water, oil and gas valves, intake and mixing valves, automatic stokers, etc., requiring motive power to effect their operation, and which additionally include means for forcibly circulating air warmed by said heat producing devices or furnaces into an enclosure or space to be heated.

An object of the present invention is to provide an electrically operated mechanism for the remote control of a heat producing device or furnace having heat regulating means and means for producing forced circulation of air warmed by said device or furnace, wherein said heat regulating means of said device or furnace and said means for producing forced circulation of the warmed air will each be controlled, in the novel and improved and ideal manner to be hereinafter fully set forth, by and with respect to the temperature at said heat producing device or furnace, as well as by and with respect to the temperature at an enclosure or space to be heated by said device or furnace.

A further object is to provide an electrically operated mechanism for the remote control of a heat producing device or furnace having heat regulating means and means for producing forced circulation of air warmed by said device or furnace, which will include a regulator motor adapted to be associated in novel and improved manner with said heat regulating means and said means for producing forced circulation of the warmed air, said regulator motor having various features and characteristics constituting novel and improved structure in mechanisms of the present character; will also include means, desirably a resistance element, arranged in an electrical circuit having remote controlling instruments, for manipulating in novel and improved manner a desirably thermal starting switch of the operating circuit of said regulator motor to close said operating circuit; and wherein presence of current in the circuit including said remote controlling instruments and said means or resistance element will be discontinued, preferably by mechanical actuation of certain of the operative elements of said regulator motor and independently of said remote controlling instruments, immediately upon the setting of the regulator motor into operation, whereby to render the starting circuit dead the instant the regulator motor commences to operate.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of the specification.

With respect to the drawings and the numerals of reference thereon, 15 represents a heating furnace including a draft damper 16 and a check damper 17. The regulator motor, indicated generally at 18, is shown applied to said furnace to regulate said draft damper and check damper, although, as will become obvious, said regulator motor can be applied to control any other devices requiring motive power to effect their operation, as, for example, valves controlling a flow of steam, water, gas, or other fluid; intake and mixing valves; and automatic stokers.

Any ordinary thermostatic element 19, in remote relation to the furnace 15, as, for instance, in a room to be heated, and an ordinary thermostatic element 20, directly subjected to the temperature of said heating furnace, within the furnace as shown, constitute means for actuating a starting switch 21, as disclosed a thermal starting switch, for the regulator motor 18.

The regulator motor 18 includes a driven or actuating shaft 22, which is suitably mounted in a casing 23 for the regulator motor, carrying crank arms 24 and 25 at its opposite ends and disposed outside of the casing 23, said crank arms 24 and 25 desirably extending in straight-angle relation to each other. Each crank arm 24 and 25 carries an outwardly extending headed pin, denoted 26 and 27, respectively, the pin 26 rotatably supporting a manipulating member or cord 28 suitably attached to an outer portion of the draft damper 16 and ridable over pulleys 29, and the pin 27 rotatably supporting a manipulating member, cord, or rod 30 suitably attached to an outer portion of the check damper 17. When the crank arms 24 and 25 are positioned as shown in full lines in Fig. 1, so that the crank arm 24 extends vertically downward and the crank arm 25 extends vertically upward, the draft damper 16 is completely closed by gravity and the check damper 17 is held wide open. When the positions of said crank arms are reversed so that the crank arm 24 extends vertically upward and the crank arm 25 extends vertically downward, the draft damper 16 is held wide open and the check damper 17 is completely closed by gravity. When the crank arms 24 and 25 are disposed between their vertical positions, both the draft damper and the check damper may be held partially open to extents depending upon the angular positions of said crank arms as will be evident.

Figures 1, 2:
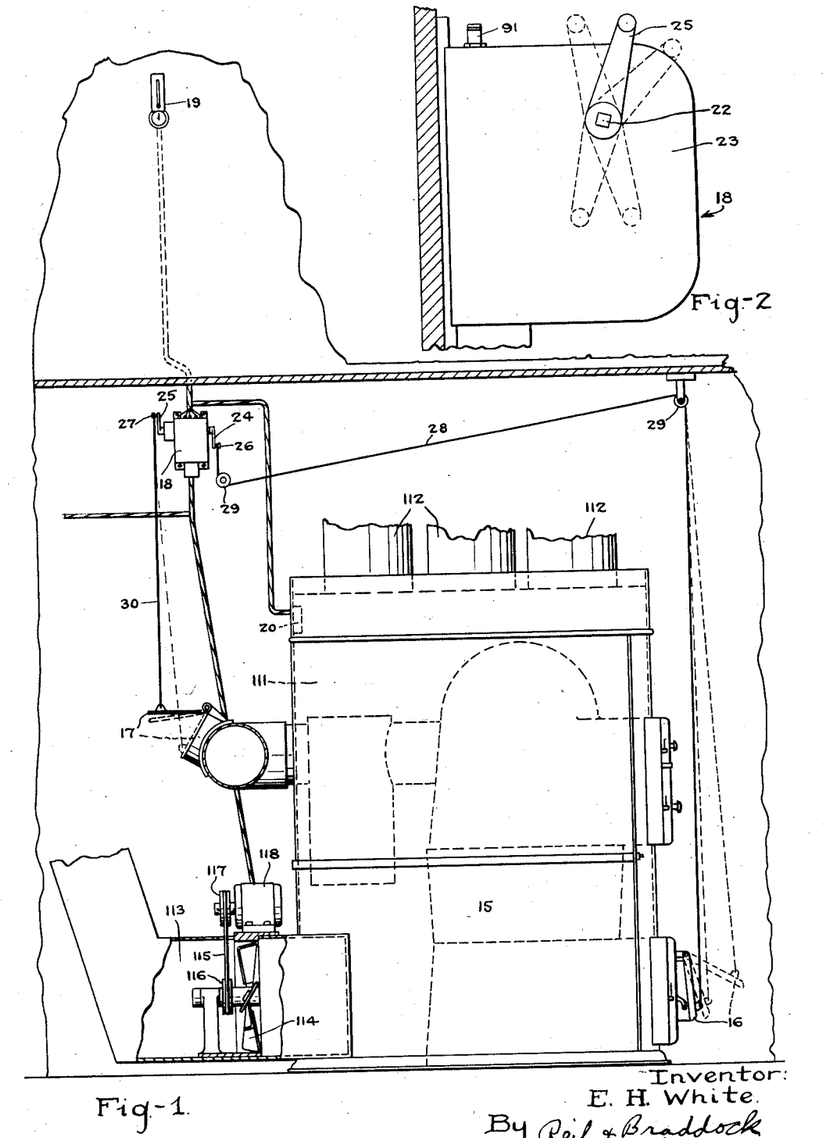
Fig. 1 is a front elevational view of a remote control regulator motor made according to the principles of the invention, disclosing said regulator motor as when applied to use to control the draft, the check, and the air blower of a heating furnace which is also shown.
Fig. 2 is an enlarged end elevational view of the regulator motor as seen from the left in Fig. 1.
Figure 3:
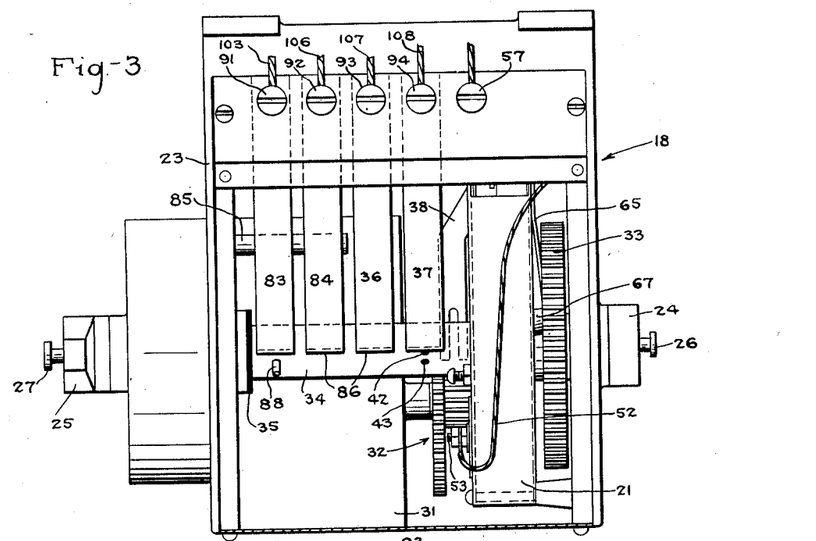
Fig. 3 is an enlarged plan view of the regulator motor casing with the cover of said casing removed, showing operating parts of said regulator motor in plan, and the thermal starting switch in edge elevation.
Figure 4:
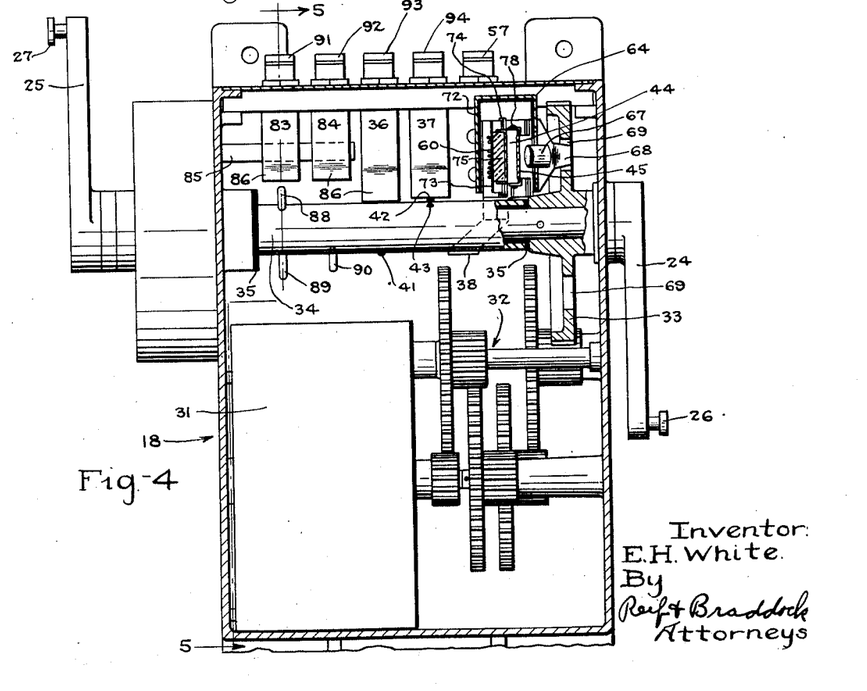
Fig. 4 is an enlarged vertical sectional view of the regulator motor casing, showing operating parts of said regulator motor in section and in elevation, and the thermal starting switch in section.

It is the function of the room thermostat 19 and the furnace thermostat 20 to control an electrical circuit which in turn controls the thermal starting switch 21, which switch in turn closes the switch of a circuit including the regulator motor 18 to cause said regulator motor to be operated in response to the closing of the electrical circuit controlling said thermal starting switch 21, to situate the driven or actuating shaft 22 in one of the several positions of the crank arms 24 and 25 indicated in full and dotted lines in Fig. 2, and to as a consequence situate the draft damper 16 and the check damper 17 in one of the positions in which each of said dampers is indicated in full and dotted lines in Fig. 1.

As shown more clearly in Figs. 3, 4, 5, 6, 7, 8 and 11, the casing 23 suitably supports an electric motor 31 which is drivingly connected by reducing gearing, represented generally at 32, to the driven or actuating shaft 22, said reducing gearing including a gear 33 fixed to said driven or actuating shaft 22. The actuating shaft 22 carries a circuit breaker drum 34 which is suitably insulated from said driven or actuating shaft as indicated at 35. A circuit breaker includes a number of conducting clips 36, 37 and 38 which make contact with the circuit breaker drum, and the conducting clips 36 and 37 are raised and lowered, as the drum rotates, by small insulating buttons upon the circuit breaker drum, there being three insulating buttons 39, 40 and 41 upon said drum for the clip 36, and two insulating buttons 42 and 43 upon said drum for the clip 37.

A motor switch consists essentially of two blades, denoted 44 and 45 respectively, the blade 44, together with other elements to be described, constituting the thermal starting switch 21. Incoming wires 46 and 47 lead to the motor 31. As shown, the wire 46 is connected to the motor switch blade 45 while the wire 47 is connected to a wire 48 leading to one side of the primary 49 of a transformer 50 and to a wire 51 leading to one side of said motor 31. The other side of the primary 49 is connected by a wire 52 to a stationary contact 53 for the blade 45, and the other side of the motor 31 is connected by a wire 54 with the blade 44 of the motor switch. One side of the secondary 55 of the transformer 50 is connected by a lead wire 56 with a terminal 57, while the other side of said secondary is connected by a lead wire 58 with one terminal 59 of a resistor 60 of the thermal starting switch 21 and supported upon the motor switch blade 44. The terminal 61 of the resistor 60 opposite the lead wire 58 is connected by means of a post 62 with the conductor clip 38. The blade 45 is insulatively attached, as at 63, upon a support 64 in the casing 23. A resilient finger 65 attached to said support at 66 carries an insulating protuberance 67 movable in an opening through said support 64, and said finger also carries a projection 68 ridable in slots or openings 69 in the gear 33.

Figures 5, 6, 7, 11:
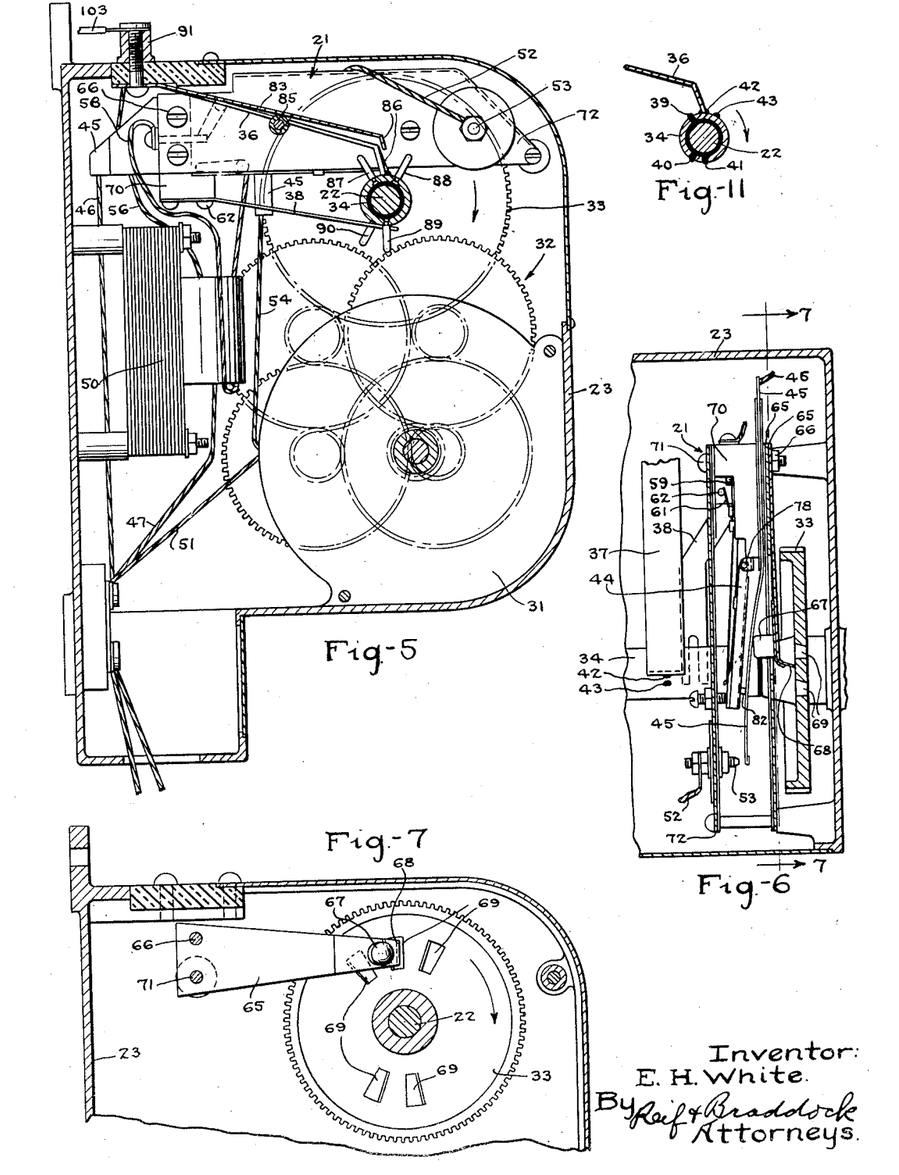
Fig. 5 is a vertical sectional view of the regulator motor, taken as on line 5—5 in Fig. 4.
Fig. 6 is a detail view of the thermal starting switch and other parts of the electrically operated mechanism in positions assumed in operation.
Fig. 7 is a detail sectional view taken as on line 7—7 in Fig. 6.
Fig. 11 is a detail sectional view taken on line 11—11 in Fig. 8.
Figures 8, 9, 10:
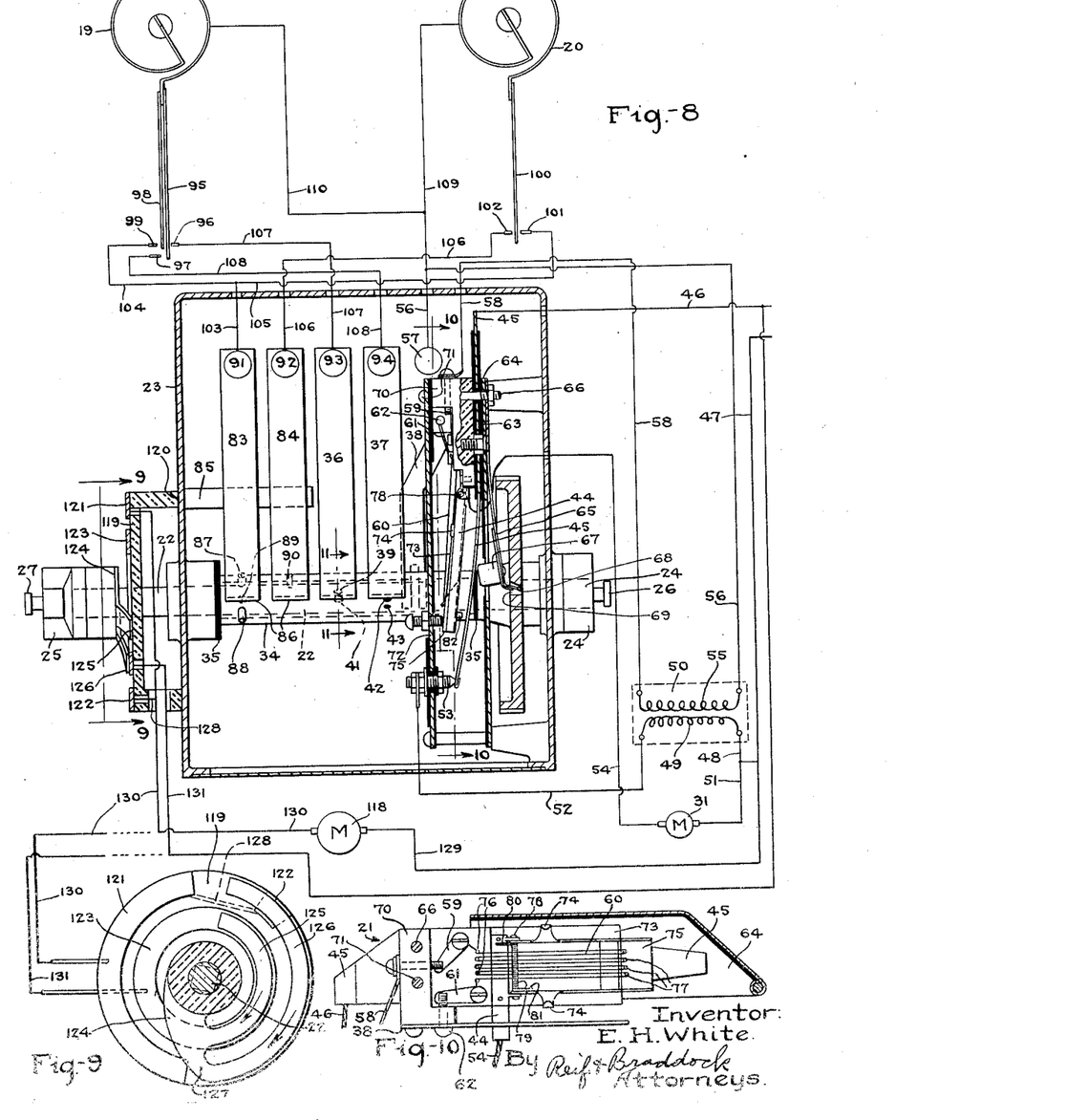
Fig. 8 is a diagrammatic view disclosing the wiring system of the electrically operated mechanism.
Fig. 9 is a detail sectional view taken on line 9—9 in Fig. 8.
Fig. 10 is a detail sectional view taken as on line 10—10 in Fig. 8.

When the electric motor 31 is at rest, the blades 44 and 45 are positioned as shown in Fig. 8. The arrangement is such that when current flows in the resistor 60, the blade 44 moves to the right in said Fig. 8 and makes contact with the blade 45. Said blade 45 is operated by the gear 33. The slots or openings 69, which are placed in said gear 33 at proper intervals, allow the resilient blade 45 to move over to the right in said Fig. 8 as said slots or openings 69 pass over the projection 68. At other times, said projection rides on the face of the gear 33 to cause the blade 45 to take the position as shown in Fig. 6. That is to say, to maintain engagement between the blades 44 and 45 and to break engagement between said blade 45 and the stationary contact 53.

The resistor 60 desirably consists of a single strand of suitable wire of relatively fine dimension having its end portions attached to the terminals 59 and 61, respectively, mounted upon an insulating block 70 itself conveniently carried, as at 71, in the motor casing 23, adjacent the blade 45, upon a support 72 in spaced relation to the support 64 and also carrying the stationary contact 53. The intermediate portion of the wire strand resistor 60 extends back and forth across the outer face of a mica sheet 73 conveniently fixed, as at 74, to the face of the blade 44 opposite the blade 45, and outer parts of said intermediate portion of the wire strand, in spaced relation to the terminals 59 and 61, are rigidly attached to a small insulating block 75 itself suitably fastened to the outer, free end of said blade 44, against the face thereof opposite the blade 45. More specifically, the insulating block 70 supports a series of alining, spaced apart metallic lugs or posts 76, and the insulating block 75 supports a similar series desirably including an equal number of alining, spaced apart metallic lugs or posts 77, about all of which lugs or posts 76 and 77 the wire strand is successively wound. In the manufacture of the thermal starting switch 21, an end of the wire strand resistor 60 thereof may be first attached to a terminal 59 or 61, an adjacent portion of said wire strand may then be wound one or more times about an outermost lug or post 76, then the next adjacent portion of the wire strand may be wound about an outermost lug or post 77, then about the lug or post 76 next adjacent one already wired, then about the lug or post 77 next adjacent one already wired, and so on, until the lugs or posts are all wired, and finally the wire strand may be attached to the terminal 61 or 59.

The blade 44 is conveniently pivoted to the insulating block 70, as by a small shaft 78 which passes through ears upon said blade 44 and said insulating block 70, and a coil spring 79 upon the shaft 78 includes a projecting end 80 in engagement with the insulating block 70 and a projecting end 81 in engagement with the blade 44, the function of said coil spring and its projecting ends 80 and 81 being to urge said blade 44 to swing on its axis toward the blade 45, whereby a contact 82 on the blade 44 can engage the blade 45. See Figs. 6 and 8. Each length of the wire resistor 60 is taut or tensioned between the lugs or posts 76 and 77 to normally hold the blade 44, against the action of the coil spring 79, out of engagement with the blade 45, and so that said blade 44 and the insulating block 75 thereon will desirably be in approximate alinement with the insulating block 70. And the wire strand resistor 60, evidently non-inductive, is composed of material having a co-efficient of expansion sufficiently great to cause immediate lengthening of said wire strand resistor to an extent to allow the contact 82 to engage the blade 45 immediately when only a very small current of electricity is applied to said resistor in a manner to be explained. In practice, application to said resistor of four watts, or even less, of operating power is quite sufficient to cause engagement between the blades 44 and 45.

The regulator motor includes conducting clips 83 and 84 which are suitably and insulatively supported in the motor casing and rest upon an insulating supporting arm 85 for said conducting clips 83 and 84. The free end of each conducting clip 83, 84, 36 and 37 includes a downward projection 86. See Fig. 5. The downward projection upon the conducting clip 83 is adapted to engage conducting posts, designated 87, 88 and 89, situated at suitably spaced apart intervals about the circuit breaker drum 34, and the downward projection upon the conducting clip 84 is adapted to engage a conducting post 90 fixed upon said circuit breaker drum 34.

Each of the conducting clips 83, 84, 36 and 37 is provided with a terminal, said terminals being designated 91, 92, 93 and 94, respectively.

The regulator motor operates in the manner as follows. As shown in Fig. 8, said motor is in an inoperative position indicated by the conducting clip 37 which is separated from the circuit breaker drum by the insulating button 42. When connection is now made from the terminal 57 to any one of the terminals 91, 92 or 93 when in electrical engagement with the circuit breaker drum 34, the secondary circuit of the transformer is closed through the resistor 60, which allows the blade 44 as in Fig. 8 to move to the right, in the manner as set forth, and make contact with the blade 45 at 82. This closes the circuit to the electric motor 31, which sets the gear 33 and the circuit breaker drum in motion. The circuit through the resistor 60 is from the secondary 55 of the transformer through the lead wire 58 to the resistor, from the resistor by the post 62 to the conducting clip 38, through the circuit breaker drum 34 and to the lead wire 56 attached to the terminal 57 by the particular connection made, and back to the secondary 55 through said lead wire 56. The motor circuit is from the lead in wire 46 to the blade 45, to the contact 82 and the blade 44, through the lead wire 54 to the motor 31, and through the lead wire 51 to the lead in wire 47. As soon as the gear 33 starts to rotate, it causes the projection 68 upon the finger 65 to ride up out of the corresponding slot or opening 69 and force the blade 45 over to the left as shown in Fig. 6, to hold engagement between the blades 44 and 45 at 82 and break engagement between the blade 45 and the stationary contact 53. The breaking of engagement between the blade 45 and the stationary contact 53 opens the primary side of the transformer and cuts the current off of the resistor 60, as will be apparent. The electric motor 31 operates until the projection 68 drops into the next slot or opening 69 in the gear 33. The control motor will then stop if it is in the position called for by the particular connection which was made between the terminal 57 and one of the terminals 91, 92 or 93. If the regulator motor is not in such position, the cycle will be repeated. That is to say, the terminal 57 may be connected with any one of the terminals 91, 92 or 93, and the motor will operate until a clip 36 or 37 is raised by one of the insulating buttons 39, 40, 41, 42 or 43 on the circuit breaker drum 34 while there is no electrical connection from said terminal 57 through any of said terminals 91, 92, 93, or 94 to the circuit breaker drum 34. The driven or actuating shaft 22 will remain in the position at which thus set by the motor 31 until connection is again made from said terminal 57 through one of said terminals 91, 92, 93 or 94 to said circuit breaker drum. When said connection is made, the motor 31 will again operate until one of the conducting clips is raised as before by an insulating button while there is no electrical connection from the terminal 57 through any of the terminals 91, 92, 93 or 94 to the circuit breaker drum.

As shown very clearly in Fig. 8, the room thermostat 19, which is a bimetallic blade, includes a lower portion supporting an arm 95 adapted to travel between spaced apart terminals 96 and 97 and an arm 98 adjacent the arm 95 adapted to engage and disengage a terminal 99 adjacent the terminal 97. The furnace thermostat 20 includes a lower portion supporting an arm 100 adapted to travel between spaced apart terminals 101 and 102.

The terminal 91 is connected, by a lead wire 103, with a lead wire 104 extending to the terminal 99 and with a lead wire 105 extending to the terminal 101. The terminal 92 is connected by a lead wire 106 with the terminal 102. The terminal 93 is connected by a lead wire 107 with the terminal 96. The terminal 94 is connected by a lead wire 108 with the terminal 97. See Fig. 8.

The lead wire 56, extending between a side of the secondary 55 and the terminal 57, is connected by a lead wire 109 with the furnace thermostat 20. A lead wire 110 connects the lead wire 109 with the room thermostat 19. See Fig. 8.

The heating furnace 15 includes the usual heating chamber 111 surrounding the fire box and having warmed air outlet pipes 112 leading to the enclosure or space to be heated. Means for producing forced circulation of the warmed air upwardly through the chamber 111 and to the enclosure or space to be heated, through the outlet pipes 112, consists, as disclosed, of an inlet pipe 113 to said chamber 111 housing a suitably mounted air blower or fan 114, said blower or fan 114 being driven by a belt 115 upon a pulley 116 fixed to the blower or fan shaft and upon a pulley 117 fixed to the shaft of an electric motor 118 for driving said blower or fan. The electric motor 118 may be supported in any convenient manner.

An insulating block 119, which is suitably supported upon the regulator motor casing 23 in any convenient manner, as at 120, fixedly supports an arcuate conducting segment 121 which extends, as shown, through an arc of a trifle less than 180°, and also fixedly supports a much shorter conducting segment 122 which is arranged in properly spaced relation to the conducting segment 121 and along the same arc as is said conducting segment 121. Said insulating block 119 additionally fixedly supports an annular conducting segment 123 which is arranged within the confines of the arc of the conducting segments 121 and 122 in concentric relation to said arc, and in spaced relation to said conducting segments 121 and 122.

The driven or actuating shaft 22 passes outwardly from the regulator motor casing through the insulating block 119 and through the annular conducting segment 123 axially thereof, and fixedly and insulatively supports a conducting element 124 including spaced contactors 125 and 126 connected together at 127, the contactor 125 having a flanged end portion adapted to wipe over the annular conducting segment 123 and the contactor 126 having a flanged end portion adapted to wipe over the conducting segments 121 and 122. Said conducting segments 121 and 122 are connected to each other by a lead wire 128 desirably attached to the inner surfaces of said conducting segments.

A lead wire 129 extends from the lead wire 47 to one side of the motor 118, and a lead wire 130 extends from the other side of said motor 118 to the conducting segment 121. A lead wire 131 extends from the lead wire 46 to the annular conducting segment 123.

During the operation in use of a heat producing device or furnace including heat regulating means, as, for example, the dampers 16 and 17 which are herein disclosed, or of some other nature, such as steam, water, oil or gas valves, intake and mixing valves, automatic stokers, etc., and also including means, the blower or fan 114 as herein disclosed, for forcibly circulating air warmed by said heat producing device or furnace into an enclosure or space to be heated, it is highly desirable that said heat producing device or furnace function in entirely automatic manner to ideally care for each and all of several different heating problems which are presented. That is to say, when said enclosure or space is at the desired and predetermined temperature, the heat regulating means should be operative to supply a minimum amount of heat and the warmed air forcing means should be idle. When said enclosure or space then falls below the desired and predetermined temperature, said heat regulating means should, when the air at the furnace is below a predetermined temperature, be operative to supply an increased amount of heat, and the warmed air forcing means should be operative, while said enclosure or space is calling for heat, whenever there is air at the heat producing device or furnace at sufficient and predetermined temperature to be effective in raising the temperature of said enclosure or space when forced thereinto by said warmed air forcing means, but said warmed air forcing means should be idle when said air at the heat producing device or furnace is below said sufficient and predetermined temperature, it being, evidently, undesirable to blow unheated air into an enclosure or space which is calling for heat. When said enclosure or space commences a call for heat at a time when there is air at the furnace of sufficiently high temperature to raise the temperature of said enclosure or space, the warmed air forcing means should become operative to force said warmed air into the enclosure or space while the heat regulating means is operative to supply a minimum amount of heat, or not much more than a minimum amount, at the heat producing device or furnace, until the enclosure or space reaches the desired and predetermined temperature, or until the temperature of the air at the furnace to be forced into said enclosure or space by the warmed air forcing means falls below said sufficient and predetermined temperature. In the case where the enclosure or space both calls for heat and reaches the desired temperature while the air at the furnace forced by the warmed air forcing means is at or above said sufficient and predetermined temperature, the heat regulating means for the heat producing device or furnace should be operative to supply a minimum amount of heat and the warmed air forcing means should become idle when said enclosure or space reaches said desired temperature, and in the case where the enclosure or space calls for heat while the air at the furnace is at or above said sufficient and predetermined temperature and the temperature of the air which is being forced from the furnace then falls below said sufficient and predetermined temperature, the warmed air forcing means should become idle and the heat regulating means should become operative to supply an increased amount of heat to bring the temperature of said air at the furnace up to said sufficient and predetermined temperature. Thereafter, when the air at the furnace reaches said sufficient and predetermined temperature, the warmed air forcing means should commence to operate. Should it happen that the warmed air forcing means at any time removes sufficient warmed air from the furnace to cause the air at the furnace to fall below said sufficient and predetermined temperature, said warmed air forcing means should become idle and the heat regulating means should become, or remain, operative to supply an increased amount of heat at the furnace. When the enclosure or space being heated reaches a desired temperature while the warmed air forcing means is operative, said heat regulating means should become, or remain, operative to supply a minimum amount of heat during an interval just before said warmed air forcing means becomes inoperative, in order that said warmed air forcing means may remove from the furnace and carry to the enclosure any surplus of air there may be of sufficient and predetermined temperature to have heating effect upon said enclosure or space, to thus further raise the temperature thereof. Said warmed air forcing means should become idle when said higher temperature is reached, or, as aforesaid, when the temperature of the air at said furnace falls below said sufficient and predetermined temperature. A heat producing device or furnace set up to operate under each of the conditions as set forth in the manner in which it is stated said device or furnace should operate, will, obviously, function ideally, considered both from the standpoint of fuel economy and the standpoint of satisfactory and efficient heating results. In other words, a heat producing device or furnace set up to so operate will attain the maximum in fuel economy, prevent overruns which ordinarily occur after the heated enclosure or space has reached the predetermined and intended temperature, and attain the maximum in temperature balance at said enclosure or space.

The heat producing device or furnace of the present invention is set up to operate under each of the conditions as set forth in the preceding paragraph in precisely the manner in which it is stated in said preceding paragraph that said device or furnace should ideally operate, as will now be explained in full.

In Fig. 8 the regulator motor shaft 22 is positioned with the parts disposed as in full lines in Figs. 1 and 2, the crank arm 24 extending vertically downward to allow the draft damper 16 to be completely closed, and the crank arm 25 extending vertically upward to cause the check damper 17 to be wide open. In said Fig. 8, the conducting clip 37 is shown resting upon the insulating button 42, the arms 95, 98 and 100 of the thermostats 19 and 20 are out of engagement with their respective terminals, the conducting clips 83 and 84 are both free from contact with their respective conducting posts upon the circuit breaker drum 34, and the blower or fan motor 118 is in open circuit to allow the blower or fan 114 to remain idle. The room thermostat 19 being out of engagement with the terminal 96, which said thermostat 19 engages when the enclosure or space calls for heat, said enclosure or space is at the desired temperature, the heat regulating means; that is, the dampers 16 and 17; is operative to supply a minimum amount of heat, and the warmed air forcing means; that is, the blower or fan 114; is idle.

Supposing that the temperature at the furnace now causes the furnace thermostat 20 to engage with either the terminal 102 or the terminal 101, nothing can happen as a result, as long as the room thermostat 19 does not engage the terminal 96. Connection between the arm 100 and the terminal 102 connects the terminal 57 with the terminal 92, but the conducting clip 84 is free from engagement with the circuit breaker drum 34. Likewise, connection between the arm 100 and the terminal 101 connects the terminal 57 with the terminal 91, but the conducting clip 83 is free from engagement with said circuit breaker drum 34. Supposing that the temperature at the enclosure or space being heated now rises to bring the arm 95 of the room thermostat 19 into engagement with the terminal 97, or to bring the arm 98 of said room thermostat into engagement with the terminal 99, nothing can happen as a result. Connection between the arm 95 and the terminal 97 connects the terminal 57 with the terminal 94, but the conducting clip 37 is free from engagement with the circuit breaker drum 34, this conducting clip resting upon the insulating button 42, as has been stated. Connection between the arm 98 and the terminal 99 connects the terminal 57 with the terminal 91, but the conducting clip 83 is free from engagement with the circuit breaker drum, as before mentioned. Supposing that the temperature at the enclosure or space being heated now falls to bring the arm 95 of the room thermostat 19 into engagement with the terminal 96, connection is made between the terminal 57 and the terminal 93. To cause the regulator motor to assume its position as in Fig. 8, the arm 98 had to engage the terminal 99, as will hereinafter be made clear, and after said arm 98 and said terminal 99 engaged each other, the regulator motor remained in the position of said Fig. 8 until said arm 95 of the room thermostat 19 engaged the terminal 96. Connection when made between the terminals 57 and 93, by engagement of the arm 95 with the terminal 96, closes the regulator motor circuit because the conducting clip 36 is in engagement with the circuit breaker drum and clear of all of its insulating buttons, as shown more clearly in Fig. 11. The regulator motor is thus caused to advance and to stop when a conducting clip 36 or 37 rides upon an insulating button while there is no electrical connection from the terminal 57 through any of the terminals 91, 92, 93 or 94 to the circuit breaker drum 34. The driven or actuating shaft 22 will remain in the position at which thus set by the motor 31 until connection is again made from said terminal 57 through one of the terminals 91, 92, 93 or 94 other than the one having the insulating button upon which the conducting clip 36 or 37 rests when said motor 31 becomes stationary. When the new connection is made, the motor 31 will again operate and stop as before when a conducting clip 36 or 37 rides upon an insulating button while there is no electrical connection from the terminal 57 through any of said terminals 91, 92, 93 or 94 to the circuit breaker drum 34.

The circuit breaker drum 34 is driven to rotate in the direction of the arrows in Figs. 5 and 11. As disclosed the insulating button 41, which is beneath the conducting clip 36, is disposed upon the circuit breaker drum 34 at location diametrically opposite the insulating button 42. The insulating button 40, which is beneath said conducting clip 36, is disposed upon the circuit breaker drum at location about 165° from the insulating button 42 and about 15° from the insulating button 41, considered from the standpoint of the direction of rotation of the driven or actuating shaft 22. The insulating button 39, which is beneath said conducting clip 36, is disposed upon the circuit breaker drum at location about 15° from said insulating button 42, between the insulating buttons 42 and 40. The insulating button 43, which is beneath the conducting clip 37, is disposed upon the circuit breaker drum at location about 165° from the insulating button 41 and about 15° from the insulating button 42. The conducting post 89, which is beneath the conducting clip 83, is disposed upon the circuit breaker drum in longitudinal alinement with said insulating button 41. The conducting post 90, which is beneath the conducting clip 84, is disposed upon said circuit breaker drum in longitudinal alinement with said insulating button 40. The conducting post 87, which is beneath said conducting clip 83, is disposed upon said circuit breaker drum in longitudinal alinement with said insulating button 39. The conducting post 88, which is beneath said conducting clip 83, is disposed upon said circuit breaker drum in longitudinal alinement with said insulating button 43.

It has been shown that when the regulator motor is positioned as in Fig. 8, nothing can happen unless or until the temperature of the enclosure or space to be heated falls to cause the arm 95 of the room thermostat 19 to engage the terminals 96, and that upon engagement of said arm 95 and terminal 96, the electric motor 31 will be set in motion. Provided that at this time the furnace is not sufficiently warm to cause the arm 100 of the furnace thermostat 20 to be in engagement with the terminal 102, said arm 100 engaging the terminal 101, the regulator motor will come to stationary position when the conducting clip 36 rides upon the insulating button 40. At this time the conducting post 90, beneath the conducting clip 84 and in alinement with said insulating button 40, will be brought into engagement with said conducting clip 84, and the conducting clip 37 will engage the circuit breaker drum. During the rotation of the circuit breaker drum to carry the insulating button 40 from its position as in Fig. 11 to its position of engagement with the conducting clip 36, the insulating button 39 will pass under said conducting clip 36, but the regulator motor will not stop, because at this time the contacts 100 and 101 will be in engagement to connect the terminal 57 with the terminal 91, and the conducting post 87 will be engaged with said conducting clip 83. When the insulating button 40 reaches the location of the conducting clip 36 and the conducting clip 37 engages the circuit breaker drum and the conducting post 90 engages the conducting clip 84, there will be no circuit from the terminal 57 to the circuit breaker drum 34 because neither the arm 98 and the terminal 99 which engage by reason of rising temperature at the enclosure or space, the arm 100 and the terminal 102 which engage by reason of rising temperature at the furnace, nor the arm 95 and the terminal 97 which engage by reason of rising temperature at the enclosure or space, are in engagement. When the conducting post 90 is in engagement with the conducting clip 84, or when any other conducting post is in engagement with its conducting clip, all of the other conducting posts are clear of the conducting clips, as will be apparent.

When the insulating button 40 is engaged by the conducting clip 36, the draft damper 16 is held approximately wide open and the check damper 17 may be approximately or completely closed by gravity.

The regulator motor, upon being brought to stationary position with said insulating button 40 engaging its conducting clip 36, remains stationary until the arm 95 engages the terminal 97, or until the arm 100 engages the arm 102. Should the arm 95 engage the arm 97 before the arm 100 engages the arm 102, the driven or actuating shaft 22 would eventually rotate back to its position as in Fig. 8, the insultaing buttons 41 and 43 passing their respective conducting clips while there is a circuit from the terminal 57 through the terminals 94 and 93, respectively, to the circuit breaker drum 34. The terminal 99 is connected in parallel with the terminal 101, and evidently nothing could happen to the regulator motor by engagement, if this were possible, of the arm 98 with said terminal 99 when said regulator motor is located with the insulating button 40 engaging the conducting clip 36, both of said terminals 99 and 101 being connected by the lead wire 103 with the terminal 91 and the conducting clip 83 being free from engagement with the circuit breaker drum 34. Upon the opening of the draft damper and the closing of the check damper, the temperature of the heat producing device or furnace, will, naturally, rise, and eventually the arm 100 of the furnace thermostat must engage the terminal 102. Thus will be made a connection between the terminal 57 and the terminal 92, and the conducting clip 84 being in engagement with the conducting post 90, the regulator motor will advance, this time to position the insulating button 41 under the conducting clip 36. Said regulator motor will come to rest, provided the elements 95 and 97 and the elements 98 and 99 are, respectively, free from engagement with each other. The elements 100 and 101 will evidently be out of engagement, said element 100 having engaged the element 102. It is theoretically possible for the arm 95 to engage the terminal 97 and for the arm 98 to later engage the terminal 99 when the draft damper is open and the check damper is closed, as just stated, before the arm 100 is brought into engagement with the terminal 102, to cause the insulating button 41 to engage the conducting clip 36, but such an occurrence is impossible in ordinary practice, because the enclosure or space is receiving its heat from the furnace which will of necessity cause the furnace thermostat 20 to be heated in advance of the room thermostat 19. But should the arm 95 for any reason engage the terminal 97 before said arm 100 engages said terminal 102, and the enclosure or space become further heated so that the arm 98 later engaged the arm 99, in the manner as to be hereinafter set forth, the regulator motor would be immediately reurned to its normal position as in Fig. 8. When the circuit breaker drum 34 is positioned to cause the insulating button 41 to separate its conducting clip 36 from said circuit breaker drum, the conducting element 124 is situated with its contactors 125 and 126 connected across the conducting segments 123 and 121 to put the blower or fan motor 118 in closed circuit. Thus the blower or fan 114 is driven to forcibly circulate air, through the outlet pipes 112 into the enclosure or space, and in time the arm 95 is caused to be brought into engagement with the terminal 97. Upon engagement of said elements 95 and 97, a connection being thus made between the terminal 57 and the circuit breaker drum, by reason of the fact that the conducting clip 37 is in engagement with said circuit breaker drum, the regulator motor advances until the insulating button 43 separates said conducting clip 37 from said circuit breaker drum. When this occurs, there will be no circuit between said terminal 57 and any of the terminals 91, 92, 93 or 94, because the elements 95 and 96, 100 and 101, and 98 and 99, respectively, are free from engagement, although the conducting clip 83 is engaging the conducting post 88, and the conducting clip 36 is engaging the circuit breaker drum. The elements 95 and 97 are set to engage each other at a degree or so of temperature less than the degree of temperature required to cause the elements 98 and 99 to engage each other. Upon the rotation of the driven or actuating shaft 22 from position where the insulating button 41 separates the conducting clip 36 from the circuit breaker drum to the position where the insulating button 43 separates the conducting clip 37 from said circuit breaker drum, the draft damper 16 is allowed to move by gravity to approximately or completely closed position and the check damper is moved to approximately wide open position. When the insulating button 43 is beneath its conducting clip 37 to separate said conducting clip from the circuit breaker drum, the contactors 125 and 126 of the conducting element 124 are still in engagement with the conducting segments 123 and 121, and the circuit through the blower or fan motor 118 is still closed. Thus the blower or fan 114 continues to operate, and in time the temperature of the enclosure or space is raised a degree or so higher to bring the arm 98 into engagement with the terminal 99. Upon engagement of said elements 98 and 99 with each other, a connection is made from the terminal 57 to the circuit breaker drum 34 through the conducting clip 83 and the conducting post 88, which is in alinement with the insulating button 43, and said circuit breaker drum is rotated to its original or normal position as shown in Fig. 8, where all of the conducting posts 87, 88, 89 and 90 are free from engagement with their conducting clips 83 and 84, respectively, and the conducting clip 36 is in engagement with the circuit breaker drum, but the enclosure or space being warm the circuit through said conducting clip 36 is broken at the terminals 95 and 96. When the driven or actuating shaft 22 rotates from position where the insulating button 43 is beneath the conducting clip 37 to the position where the insulating button 42 is beneath this mentioned conducting clip, the contactors 125 and 126 of the conducting element 124 ride clear of the conducting segments 123 and 121, to be positioned about as shown in Fig. 9, to thus break the circuit through the blower or fan motor 118 and cause said blower or fan motor to come to rest. During the operation of the blower of fan 114 while the insulating button 43 is positioned beneath the conducting clip 37, the blower or fan 114 removes a considerable amount of heated air from the furnace and carries said heated air into the enclosure or space, as will be obvious.

Supposing that with the parts positioned as in Fig. 8, the enclosure or space calls for heat while the furnace is warm, the arm 100 being in engagement with the terminal 102, the circuit breaker drum rotates from its position as in Fig. 11 to its position causing the insulating button 39 to separate the conducting clip 36 from said circuit breaker drum. Such rotation of the circuit breaker drum may open the draft damper 16 a trifle, or may not cause said draft damper to be opened at all, if this is preferable. When said insulating button 39 falls beneath the conducting clip 36 while the elements 100 and 102 are in engagement, the regulator motor comes to stationary position for the reason that there is no connection between the terminal 57 and the circuit breaker drum. The conducting clip 37 will at this time engage said circuit breaker drum, but the elements 95 and 97 will be free from engagement. The conducting clip 84 will at this time be clear of said circuit breaker drum. The conducting clip 83 will at this time engage said circuit breaker drum, but the elements 98 and 99, and 100 and 101, respectively, will be free from engagement. When the driven or actuating shaft 22 rotates from its position as in Figs. 8 and 11 to its position where the insulating button 39 separates the conducting clip 36 from the circuit breaker drum, the contactors 125 and 126 upon the conducting segment 124 travel from their position as in Fig. 9 to position where said contactors engage the conducting segments 123 and 122 to close the circuit through the blower or fan motor 118. Said motor 118 thus drives the blower or fan 114 to remove heated air from the furnace and force said heated air into the enclosure or space. Upon the enclosure or space becoming warmed to eventually cause the elements 95 and 97 to engage, the operations as above described are repeated, but the driven or actuating shaft 22 in the present instance rotates directly from its position where said insulating button 39 is separating its conducting clip 36 from the circuit breaker drum, to its position where said insulating button 43 is separating its conducting clip 37 from said circuit breaker drum. When the insulating button 39 is beneath its conducting clip 36, and the blower or fan 114 is operating, said blower or fan may remove sufficient warmed air from the furnace to reduce the temperature at the thermostat 20 and thus cause the arm 100 to be disengaged from the arm 102 and to engage the arm 101. In such case, the driven or actuating shaft 22 will rotate, by reason of the connection thus made between the terminal 57 and the circuit breaker drum through the conducting clip 83 and the conducting post 87, to position to cause the insulating button 40 to be located beneath its conducting clip 36. Thus the parts will be situated, and will thereafter operate in the manner, as hereinbefore fully described. When the insulating button 41 is beneath the conducting clip 36 and the blower or fan removes sufficient warmed air from the furnace to reduce the temperature at the thermostat 20 to cause the arm 100 to be disengaged from the arm 102 and to engage the arm 101, the driven or actuating shaft 22 rotates, past the positions where the insulating buttons 43, 42 and 39 engage their respective conducting clips, to the position where the insulating button 40 engages the conducting clip 37, as will be evident, and said driven or actuating shaft 22 remains in such position until the temperature at the thermostat rises to cause the elements 100 and 102 to again engage.

For each insulating button 39, 40, 41, 42 and 43, there is a corresponding slot or opening 69 in the gear 33.

Manipulating elements suitable to a particular purpose can be substituted for the crank arms 24 and 25, it being apparent that different types of devices, such as valves, automatic stokers, etc., to be remotely controlled and requiring motive power to effect their operation, may have to be associated with the driven or actuating shaft, such as 22, of a regulator motor in a manner entirely different from that of associating the draft damper 16 and the check damper 17 with the driven or actuating shaft 22 as illustrated and described.

It will be appreciated that the employment of a thermal starting switch, such as 21, which is directly responsive to its operation to expanding and contracting actions of a resistance element, such as 60, itself expanding and contracting immediately upon receiving flow of current, makes provision in the present electrically operated mechanism for efficient operation of a regulator motor circuit control switch practically instantaneously with the closing of the circuit controlling said thermal starting switch. Employment of the non-inductive resistance element 60, in the manner as fully set forth, allows operation of the thermal starting switch by means of a controlling circuit therefor which incorporates very delicate and fine electrical contacts, for the reason that the operating power required by the resistance element to accomplish actuation of the thermal starting switch of the invention does not have to exceed four watts, which, flowing through a non-inductive circuit, causes practically no arcing whatever at the controlling instrument contacts, such as those made between the terminals 96, 97 and 99 and the room thermostat 19, and between the terminals 101 and 102 and the furnace thermostat 20. The present arrangement is a great and valuable improvement over arrangements heretofore in vogue for such work as temperature regulation and humidity control, and for a variety of other uses.

An important feature of my electrically operated mechanism is the unique mechanical arrangement of operating elements of the regulator motor, especially in conjunction with the thermal starting switch, making it necessary for the remote controlling instruments to only close the starting circuit of the regulator motor without having to open said starting circuit. Said arrangement is such that current ceases to flow in the regulator motor starting circuit as soon as the gear train is set in motion, by reason of mechanical actuation of the starting switch causing the circuit in the primary winding of the transformer, supplyng the energy to the starting switch, to be opened.

Another valuable feature of the present remote control regulator motor as a whole is that its mechanical arrangement is such that circuit breaker clips and control or regulator circuit terminals can be readily added or removed and placed in adjusted positions. Accordingly, the number of stops of the regulator motor can be increased or decreased without necessity for material changes in the general mechanism, and said regulator motor can be stopped at positions which may bear any desired relations to each other. For instance, the insulating buttons 39 and 43 may be closer to or further away from the insulating button 42 in order that when the driven or actuating shaft 22 is positioned to cause either of said insulating buttons 39 or 43 to separate its conducting clip 36 or 37 from the circuit breaker drum, the draft damper may be open an increased or a decreased amount. Obviously, the cord 28 could include more or less slack so that the draft damper would not be open at all while the circuit breaker drum was positioned to locate the insulating button 39 beneath the conducting clip 36 or the insulating button 43 beneath the conducting clip 37.

It will be evident that the present heat producing device or furnace will function to care for each and all of the heating problems which various situations may present. The heat regulating means will be operative to supply a minimum amount of heat and the warmed air forcing means will be idle when the enclosure or space is at the desired temperature. The heat regulating means will be operative to supply a sufficient amount of heat and the warmed air forcing means will be operative whenever the enclosure or space falls below the desired temperature and the air at the heat producing device or furnace is at sufficient and predetermined temperature to be effective in raising the temperature of said enclosure or space when forced thereinto by said warmed air forcing means. The heat regulating means will be operative to supply an increased amount of heat and the warmed air forcing means will be idle whenever the enclosure or space falls below the desired temperature and the air at the heat producing device or furnace is below sufficient temperature to be effective in raising the temperature of said enclosure or space when forced thereinto. At a time when there is air at the furnace of sufficiently high temperature to raise the temperature of the enclosure or space and said enclosure or space commences a call for heat, the warmed air forcing means becomes operative and the heat regulating means remains operative to supply a minimum amount of heat, or not much more than a minimum amount, at the heat producing device, until the enclosure or space reaches the desired temperature, or until the temperature of the air at the furnace falls below the predetermined temperature. When the enclosure or space then reaches the desired temperature while the air at the furnace is at or above said predetermined temperature, the heat regulating means becomes operative to supply a minimum amount of heat and the warmed air forcing means becomes idle, and when the temperature of the air at the furnace instead falls below said predetermined temperature, the warmed air forcing means becomes idle and the heat regulating means becomes operative to supply an increased amount of heat to bring the temperature of said air at the furnace up to said predetermined temperature. Upon the temperature of the air at the furnace then reaching said predetermined temperature, the warmed air forcing means commences to operate. At any time when the warmed air forcing means removes sufficient warmed air from the furnace to cause the air at the furnace to fall below said predetermined temperature, said warmed air forcing means becomes idle and the heat regulating means becomes, or remains, operative to supply an increased amount of heat at the furnace. When the warmed air forcing means is operative and the enclosure or space being heated reaches a certain temperature, the heat regulating means becomes, or remains, operative to supply a minimum amount of heat for a period of time before said warmed air forcing means becomes inoperative, so that air of sufficient temperature to have heating effect upon the enclosure or space may be removed from the furnace and forced into said enclosure or space to raise the temperature thereof to said predetermined temperature. And the warmed air forcing means becomes inoperative when said predetermined temperature at the enclosure or space is reached.

The present heat producing device or furnace, it will be apparent, functions in ideal manner, considered from the standpoint of fuel economy as well as from the standpoint of desired heating results; it is, in fact, set up to operate to attain the maximum in fuel economy, to prevent overruns of the device or furnace which ordinarily occur after a heated enclosure or space has reached the predetermined and intended temperature, and to attain the maximum in temperature balance at said enclosure or space.

Especial attention is called to the fact that the present electrically operated mechanism includes but a single room thermostat 19 which is composed of a single bimetallic strip or blade. The regulator motor, and consequently the heat regulating means and the warmed air forcing means, are all thus responsive in their operations to a single thermostatic device situated in the enclosure or space to be heated, as modified by the conditions of the furnace thermostat. Evidently, by placing said regulator motor and the heat regulating means and the warmed air forcing means under the control of a single, one blade room thermostat, instead of under two separate and distinct room thermostats as heretofore, one for controlling the heat regulating means and another for assisting in controlling the warmed air forcing means, the operations of said heat regulating means and said warmed air forcing means are of necessity in accord and synchronism. That is to say, said heat regulating means and said warmed air forcing means of the invention being directly responsive in their operations to a single thermostatic element, must operate in complete accord, the one with regard to the other, as will be evident, whereas, when a pair of room thermostats are employed, as heretofore, one controlling the heat regulating means and another controlling the warmed air forcing means, said heat regulating means and said warmed air forcing means need not of necessity be actuated in accord, and probably will not be, it being well known that no two thermostatic devices can be set to operate in precisely the same manner under all conditions of use. When two room thermostats are employed, it is possible, and perhaps probable, that the one which controls the heat regulating means may be, or become, incapable of acting in accord and synchronism with the one which assists in the control of the warmed air forcing means.

What I claim is:—

1. In an electrically operated mechanism for the remote control of a device requiring motive power to effect its operation, a motor for regulating said device, an operating electrical circuit for said motor, a remotely controlled electrical circuit including a plurality of thermostatically actuated instruments each adapted to separately make said remotely controlled electrical circuit, and means in said remotely controlled electrical circuit for controlling said motor operating circuit.

2. In an electrically operated mechanism for the remote control of a heat producing device including heat regulating means and means for forcibly circulating air warmed by said heat producing device into a space to be heated, a motor for controlling said heat regulating means and said warmed air circulating means, an operating electrical circuit for said motor, a remotely controlled electrical circuit, means in said remotely controlled electrical circuit for controlling said motor operating circuit, and a plurality of thermostatically actuated switches each adapted to separately make said remotely controlled electrical circuit.

3. In an electrically operated mechanism for the remote control of a device requiring motive power to effect its operation, a motor for regulating said device, an operating electrical circuit for said motor, a remotely controlled electrical circuit including a plurality of thermostatically actuated instruments each adapted to separately make said remotely controlled electrical circuit, and resistance means in said remotely controlled electrical circuit for controlling said motor operating circuit.

4. In an electrically operated mechanism for the remote control of a heat producing device including heat regulating means and means for forcibly circulating air warmed by said heat producing device into a space to be heated, a motor for controlling said heat regulating means and said warmed air circulating means, an operating electrical circuit for said motor, a remotely controlled electrical circuit, expansible and contractible resistance means in said remotely controlled electrical circuit for controlling said motor operating circuit, and a plurality of thermostatically actuated switches each adapted to separately make said remotely controlled electrical circuit.

5. In an electrically operated mechanism for the remote control of a heat producing device including heat regulating means and means for forcibly circulating air warmed by said heat producing device into a space to be heated, a motor for controlling said heat regulating means and said warmed air circulating means, an operating electrical circuit for said motor, a remotely controlled electrical circuit, means in said remotely controlled electrical circuit for controlling said motor operating circuit, a thermostatically actuated switch responsive to temperature changes at said heat producing device for making said remotely controlled electrical circuit, and a thermostatically actuated switch responsive to temperature changes at said enclosure for making said remotely controlled electrical circuit.

6. In an electrically operated mechanism for the remote control of a heat producing device including heat regulating means and means for forcibly circulating air warmed by said heat producing device into a space to be heated, a motor for controlling said heat regulating means and said warmed air circulating means, an operating electrical circuit for said motor, a remotely controlled electrical circuit, expansible and contractible resistance means in said remotely controlled electrical circuit for controlling said motor operating circuit, a thermostatically actuated switch responsive to temperature changes at said heat producing device for making said remotely controlled electrical circuit, and a thermostatically actuated switch responsive to temperature changes at said enclosure for making said remotely controlled electrical circuit.

7. In an electrically operated mechanism for the remote control of a heat producing device including heat regulating means and means for forcibly circulating air warmed by said heat producing device into a space to be heated, a motor for controlling said heat regulating means and said warmed air circulating means, an operating electrical circuit for said motor, a remotely controlled electrical circuit, a thermal starting switch for controlling said motor operating circuit, said thermal starting switch including an expansible and contractible resistance element arranged in said remotely controlled circuit and being responsive in its operation to expanding and contracting actions of said resistance element, and a plurality of thermostatically actuated switches each adapted to separately make said remotely controlled electrical circuit.

8. In an electrically operated mechanism for the remote control of a heat producing device including heat regulating means and means for forcibly circulating air warmed by said heat producing device into a space to be heated, a motor for controlling said heat regulating means and said warmed air circulating means, an operating electrical circuit for said motor including a motor starting switch having a movable element, a remotely controlled electrical circuit, means including an expansible and contractible resistance element for opening and closing said motor starting switch, said resistance element being arranged in said remotely controlled electrical circuit to retain said movable element of the motor starting switch in a withdrawn position when said remotely controlled circuit is open and said resistance element is as a result contracted and to allow said movable element of the motor starting switch to move to position closing said motor operating circuit when said remotely controlled circuit is closed and said resistance element is as a result expanded, a thermostatically actuated switch responsive to temperature changes at said heat producing device for making said remotely controlled electrical circuit, and a thermostatically actuated switch responsive to temperature changes at said space for making said remotely controlled electrical circuit.

9. In an electrically operated mechanism for the remote control of a heat producing device including heat regulating means and means for forcibly circulating air warmed by said heat producing device into a space to be heated, a motor for controlling said heat regulating means and said warmed air circulating means and capable of actuating each of said means to any predetermined one of a plurality of different conditions, a plurality of thermostatically actuated instruments for separately starting the operations of said motor, and means operative when each of said heat regulating means and said warmed air circulating means is in any one of said plurality of different conditions as predetermined by said thermostatically actuated instruments for discontinuing the operations of said motor.

10. In an electrically operated mechanism for the remote control of a heat producing device including heat regulating means and means for forcibly circulating air warmed by said heat producing device into a space to be heated, a motor for controlling said heat regulating means and said warmed air circulating means and capable of actuating each of said means to any predetermined one of a plurality of different conditions, a plurality of thermostatically actuated instruments one responsive to temperature changes at said heat producing device and another responsive to temperature changes at said space for separately starting the operations of said motor, and means operative when each of said heat regulating means and said warmed air circulating means is in any one of said plurality of different conditions as predetermined by said thermostatically actuated instruments for discontinuing the operations of said motor.

11. In an electrically operated mechanism for the remote control of a heat producing device including heat regulating means and means for forcibly circulating air warmed by said heat producing device into a space to be heated, a motor for controlling said heat regulating means and said warmed air circulating means, an operating electrical circuit for said motor including motor starting mechanism, a remotely controlled electrical circuit for controlling said motor starting mechanism, a thermostatically actuated switch responsive to temperature changes at said heat producing device for making said remotely controlled electrical circuit, and thermostatically actuated means responsive to temperature changes at said space for making said remotely controlled electrical circuit.

12. In an electrically operated mechanism for the remote control of a device requiring motive power to effect its operation, a motor for regulating said device, an operating electrical circuit for said motor including a motor starting mechanism, a remotely controlled electrical circuit including a plurality of thermostatically actuated switches each adapted to separately close said motor starting switch, and means operative upon the setting of said regulator motor into operation for discontinuing flow of current in said remotely controlled electrical circuit.

13. In an electrically operated mechanism for the remote control of a heat producing device including heat regulating means and means for forcibly circulating air warmed by said heat producing device into a space to be heated, a motor for controlling said heat regulating means and said warmed air circulating means, an operating electrical circuit for said motor including a motor starting mechanism, a remotely controlled electrical circuit, a thermostatically actuated switch in said remotely controlled circuit responsive to temperature changes at said heat producing device for closing said motor starting switch, a thermostatically actuated switch in said remotely controlled circuit responsive to temperature changes at said space for closing said motor starting switch, and means operative upon the setting of said motor into operation for discontinuing flow of current in said remotely controlled electrical circuit.

14. In an electrically operated mechanism for the remote control of a heat producing device including heat regulating means and means for forcibly circulating air warmed by said heat producing device into a space to be heated, a motor for controlling said heat regulating means and said warmed air circulating means, an operating electrical circuit for said motor including motor starting mechanism, a remotely controlled electrical circuit for controlling said motor starting mechanism, a thermostatically actuated switch responsive to temperature changes at said heat producing device for making said remotely controlled electrical circuit, a thermostatically actuated switch responsive to temperature changes at said space for making said remotely controlled electrical circuit, and means operative upon the setting of said regulator motor into operation for discontinuing flow of current in said remotely controlled electrical circuit.

15. In an electrically operated mechanism for the remote control of a heat producing device including heat regulating means and means for forcibly circulating air warmed by said heat producing device into a space to be heated, a motor for controlling said heat regulating means and said warmed air circulating means and capable of actuating each of said means to any predetermined one of a plurality of different conditions, an operating electrical circuit for said motor including a motor starting mechanism, a remotely controlled electrical circuit for controlling said motor starting mechanism, a thermostatically actuated switch responsive to temperature changes at said heat producing device for making said remotely controlled electrical circuit, a thermostatically actuated switch responsive to temperature changes at said space for making said remotely controlled electrical circuit, means operative upon the setting of said regulator motor into operation for discontinuing flow of current in said remotely controlled electrical circuit, and means operative when each of said heat regulating means and said warmed air circulating means is in any one of said plurality of different conditions as predetermined by said thermostatically actuated switches for discontinuing the operations of said motor.

16. In an electrically operated mechanism for the remote control of a heat producing device including heat regulating means and means for forcibly circulating air warmed by said heat producing device into a space to be heated, mechanism for actuating each of said heat regulating means and said air circulating means to any predetermined one of a plurality of different conditions, means responsive to temperature changes at said heat producing device, and means responsive to temperature changes at said space, said temperature responsive means always cooperating with each other to control each of the operations of said mechanism.

17. In an electrically operated mechanism for the remote control of a heat producing device including heat regulating means and means for forcibly circulating air warmed by said heat producing device into a space to be heated, unitary mechanism for actuating each of said heat regulating means and said air circulating means to any one of a plurality of different conditions, means responsive to temperature changes at said heat producing device, and means responsive to temperature changes at said space, said temperature responsive means always cooperating with each other to control all of the operations of said unitary mechanism.

18. In an electrically operated mechanism for the remote control of a heat producing device including heat regulating means and means for forcibly circulating air warmed by said heat producing device into a space to be heated, means responsive to temperature changes at said heat producing device, and a single thermostatic element responsive to temperature changes at said space, said temperature responsive means and said thermostatic element always cooperating with each other to control all of the operations of said heat regulating means and said warmed air circulating means.

19. In an electrically operated mechanism for the remote control of a heat producing device including heat regulating means and means for forcibly circulating air warmed by said heat producing device into a space to be heated, a motor for controlling said heat regulating means and said warmed air circulating means, means responsive to temperature changes at said heat producing device, and means responsive to temperature changes at said space, said temperature responsive means always cooperating with each other to control all of the operations of said motor, and said means responsive to temperature changes at said space comprising a single thermostatic element.

20. In an electrically operated mechanism for the remote control of a heat producing device including heat regulating means and means for forcibly circulating air warmed by said heat producing device into a space to be heated, a motor for controlling said heat regulating means and said warmed air circulating means, an operating electrical circuit for said motor, a remotely controlled electrical circuit, means in said remotely controlled electrical circuit for controlling said motor operating circuit, means responsive to temperature changes at said heat producing device, and means responsive to temperature changes at said space, said temperature responsive means together controlling said remotely controlled electrical circuit, and said means responsive to temperature changes at said space comprising a single thermostatic blade.

EVERETT H. WHITE.